US009819600B2

(12) United States Patent
Kim et al.

(10) Patent No.: US 9,819,600 B2
(45) Date of Patent: Nov. 14, 2017

(54) APPARATUS AND METHOD FOR DETECTING NETWORK CONGESTION BASED ON DESTINATION NODE

(71) Applicant: Korea University Research and Business Foundation, Seoul (KR)

(72) Inventors: Hwangnam Kim, Seoul (KR); Hyun S. Kim, Seongnam-Si (KR)

(73) Assignee: Korea University Research and Business Foundation, Seoul (KR)

(*) Notice: Subject to any disclaimer, the term of this patent is extended or adjusted under 35 U.S.C. 154(b) by 121 days.

(21) Appl. No.: 14/930,172

(22) Filed: Nov. 2, 2015

(65) Prior Publication Data
US 2016/0080281 A1    Mar. 17, 2016

Related U.S. Application Data

(63) Continuation of application No. PCT/KR2014/000840, filed on Jan. 29, 2014.

(30) Foreign Application Priority Data

May 3, 2013 (KR) .................. 10-2013-0050239

(51) Int. Cl.
*H04L 12/805* (2013.01)
*H04W 28/02* (2009.01)
(Continued)

(52) U.S. Cl.
CPC .............. *H04L 47/36* (2013.01); *H04L 69/16* (2013.01); *H04W 28/0284* (2013.01);
(Continued)

(58) Field of Classification Search
CPC ......... H04L 47/36; H04L 69/16; H04L 47/11; H04L 47/34; H04W 28/0284; H04W 80/02; H04W 80/06
See application file for complete search history.

(56) References Cited

U.S. PATENT DOCUMENTS 7,502,319 B2 * 3/2009 Youn ............... H04L 47/10
370/230
7,710,870 B2    5/2010 Lee et al.
(Continued)

FOREIGN PATENT DOCUMENTS

KR    20020040471 A    5/2002
KR    100761935 B1    9/2007
(Continued)

OTHER PUBLICATIONS

International Search Report of PCT/KR2014/000840 dated May 27, 2014.

*Primary Examiner* — Jay P Patel
(74) *Attorney, Agent, or Firm* — Fox Rothschild LLP (57) ABSTRACT

An apparatus and a method for detecting network congestion based on a destination node are provided. To elaborate, the apparatus may include: a physical information extraction unit that extracts physical information of an electrical signal received through an antenna of the destination node; a MAC information extraction unit that extracts a size of a MAC frame payload from a MAC frame on the basis of the extracted physical information; a TCP information extraction unit that extracts a size of service data included in the MAC frame payload; a data size comparison unit that compares the size of the MAC frame payload with the size of the service data and generates comparison result data; and a congestion detection unit that receives the comparison result data, compares the comparison result data with a predetermined threshold value, and determines presence or absence of network congestion.

11 Claims, 8 Drawing Sheets

(51) Int. Cl.
*H04L 29/06* (2006.01)
*H04W 80/02* (2009.01)
*H04W 80/06* (2009.01)
*H04L 12/801* (2013.01)

(52) U.S. Cl.
CPC ............... *H04L 47/11* (2013.01); *H04L 47/34* (2013.01); *H04W 80/02* (2013.01); *H04W 80/06* (2013.01)

(56) References Cited

U.S. PATENT DOCUMENTS

| | | | | |
|---|---|---|---|---|
| 2005/0147040 | A1* | 7/2005 | Vayanos | H03M 13/2707 370/235 |
| 2005/0169205 | A1* | 8/2005 | Grilli | H03M 13/2703 370/313 |
| 2005/0193309 | A1* | 9/2005 | Grilli | H03M 13/2707 714/752 |
| 2006/0126511 | A1* | 6/2006 | Youn | H04L 47/10 370/235 |
| 2006/0187840 | A1 | 8/2006 | Cuffaro et al. | |
| 2008/0248756 | A1* | 10/2008 | Yi | H04B 7/2612 455/67.11 |
| 2012/0182867 | A1* | 7/2012 | Farrag | H04W 28/0236 370/230 |

FOREIGN PATENT DOCUMENTS

| | | |
|---|---|---|
| KR | 10-0895182 B1 | 4/2009 |
| KR | 20130040087 A | 4/2013 |
| WO | 2013051910 A2 | 4/2013 |

\* cited by examiner

APPARATUS AND METHOD FOR DETECTING NETWORK CONGESTION BASED ON DESTINATION NODE

CROSS-REFERENCE TO RELATED APPLICATION

This application is a Continuation of International Application No. PCT/KR2014/000840, filed Jan. 29, 2014, which claims priority from the Korean Patent Application No. 10-2013-0050239, filed on May 3, 2013, the entire disclosures of which are incorporated herein by reference in their entirety.

TECHNICAL FIELD

The present disclosure pertains generally to an apparatus and method for detecting network congestion based on a destination node.

BACKGROUND

A TCP protocol at a transport layer plays an important role, i.e., congestion control, for ensuring accurate data transmission between a source node that generates and transmits data and a destination node that finally receives the data. In most of conventional TCP congestion control techniques, at the source node, presence or absence of congestion is determined and the congestion is controlled.

Most of congestion situations occur at a wireless router or a wireless AP having both wired and wireless environments. This is because a wired device has a higher data rate than a wireless device, and, thus, the throughput in a wireless network cannot be equal to the throughput in a wired network. Traditional congestion control mechanisms were suggested long before commercialization of a wireless network technique. Therefore, at the present time where a wireless internet usage rate has been rapidly increased by using smart devices, new techniques for solving the problems of the previously suggested techniques have been suggested. As such, it becomes very important to improve performance of a congestion control technique in a TCP communication.

In most of conventional TCP congestion control techniques, at the source node that generates and transmits a packet, presence or absence of congestion is determined and the congestion is controlled. Since the source node is a starting point for transmitting a packet, it may be efficient to directly determine presence or absence of congestion and control the congestion at the source node.

However, since network congestion is highly likely to occur at the wireless AP or router positioned between the source node and the destination node, a congestion level cannot be accurately determined by using only the above-described technique. Further, an effect of congestion control based on an inaccurate determination result is insignificant. Therefore, it may be more efficient to detect presence or absence of congestion at the destination node directly affected from the wireless AP or router.

Meanwhile, a conventional congestion control technique mainly using only the destination node has a problem that a control instruction needs to be transmitted from the destination node to the source node. This incurs additional cost, and the existing TCP standards need to be greatly changed in order to avoid such a problem.

In this regard, Korean Patent No. 10-0895182 (entitled "Transport control method of wireless communication system") describes a technique about a TCP.

DISCLOSURE OF THE INVENTION

Problems to be Solved by the Invention

In view of the foregoing problems, the present disclosure concerns an apparatus and method capable of comparing data sizes of respective protocol layers and thus determining presence or absence of network congestion at a destination node without modifying the existing TCP standards.

Means for Solving the Problems

In the present disclosure, there is provided an apparatus for detecting network congestion based on a destination node. The apparatus may include: a physical information extraction unit configured to extract physical information of an electrical signal received through an antenna of the destination node; a MAC information extraction unit configured to extract a size of a MAC frame payload from a MAC frame on the basis of the extracted physical information; a TCP information extraction unit configured to extract a size of service data included in the MAC frame payload; a data size comparison unit configured to compare the size of the MAC frame payload with the size of the service data and generate comparison result data; and a congestion detection unit configured to receive the comparison result data from the data size comparison unit, compare the comparison result data with a predetermined threshold value, and determine presence or absence of network congestion.

There is also provided a method for detecting network congestion based on a destination node by using an apparatus for detecting network congestion based on a destination node. The method may include: extracting physical information of an electrical signal received through an antenna of the destination node; extracting a size of a MAC frame payload from a MAC frame on the basis of the extracted physical information; extracting a size of service data included in the MAC frame payload; comparing the size of the MAC frame payload with the size of the service data and generating comparison result data; and comparing the generated comparison result data with a predetermined threshold value to determine presence or absence of network congestion.

Effect of the Invention

A congestion level is reflected to network service quality requirements, and, thus, it is possible to check with a service in real time. If the service has an unsatisfactory quality, as the grounds of the problem, not only a distance to a wireless AP or a packet error rate of a link but also congestion of the wireless AP is considered. Therefore, it is possible to provide a wider range of choices of solution.

Further, the method for detecting congestion suggested by the present disclosure can be checked at a higher layer of a transport layer including TCP standards. Accordingly, presence or absence of congestion can also be checked at an application layer for an operating system and a user interface of a corresponding device. If it is possible to check this at the application layer capable of controlling an internet service, the present disclosure can be applied to a method for regulating network traffic assigned to various services with various requirements. Therefore, according to the above-described technical means for solving the problem, since presence or absence of network congestion is checked at the application layer, it is possible to estimate network traffic to be reduced depending on a congestion level, and, thus, there is provided a wide range of choices, such as to reduce traffic of a certain service or temporarily stop the service, on the basis of a priority in using traffic of various internet services and the possibility of quality degradation.

If it is burdensome to transfer information to the application layer, it is possible to use the information at a corresponding layer including the TCP standards. As described above, the source node is originally a subject of congestion control. However, the destination node may partially control congestion. This means that although there may be various constraints, a congestion checking technique that enables congestion control can be based on the destination node.

Further, when the destination node detects network congestion and then controls the network congestion by switching its connection object to another wireless AP or sequentially stopping low-priority services among various network services, the congestion control technique functions.

MODE FOR CARRYING OUT THE INVENTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "step of" does not mean "step for".

Prior to detailed description of a technique suggested by the present disclosure, the terms to be used in the entire specification will be defined.

Figure 1:
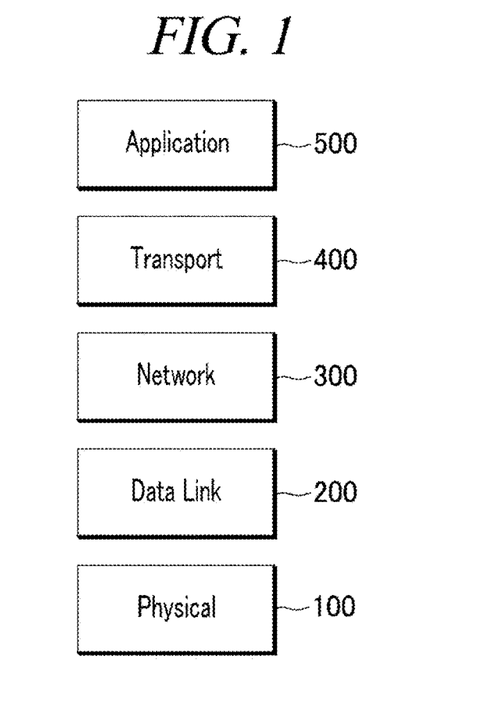
FIG. 1 illustrates a communication standard required for interconnection between communication devices applied to an exemplary embodiment of the present disclosure.

FIG. 1 illustrates a communication standard required for interconnection between communication devices.

A first layer as the lowest layer is a physical layer 100. The physical layer 100 defines all of physical parts equipped in all network devices for communication. A second layer is a data link layer 200. The data link layer 200 separates a data frame receiving object and a data frame transmitting object and controls communication between the two objects. A third layer is a network layer 300. The network layer 300 generates address systems of network devices and a transmission path required for data transmission and receipt. A fourth layer is a transport layer 400. The transport layer 400 defines communication between an object that generates data and an object that finally needs the generated data. A fifth layer as the uppermost layer is an application layer 500. The application layer 500 defines various kinds of services which can use a network without considering the situations of the lower layers.

A "MAC (Media Access Control) frame" means the unit of information transmitted from the data link layer 200. The MAC frame can be defined on the basis of IEEE 802.11 wireless local area network (LAN) standard.

A "MAC frame payload" refers to data included in the MAC frame except a header and means data to be actually transmitted from a source node. Herein, the MAC frame payload may include header information of the network layer 300 and the transport layer 400 as the upper layers of the data link layer 200.

"Service data" refers to data of the transport layer 400 except a header and means data to be actually transmitted.

In the following, for example, there will be described network congestion which may occur in downlink of the IEEE 802.11 standard-based wireless TCP (Transmission Control Protocol)/IP (Internet Protocol) network. However, this is just one example, and the present systems and methods described herein can be applied to other network congestion than the congestion in downlink of the IEEE 802.11 standard-based wireless TCP/IP network.

In some scenarios, information of the transport layer 400 and the data link layer 200 is used. The transport layer 400 conducts "end-to-end" communication that enables communication between a source node and a destination node. A protocol of the transport layer 400 is divided into a TCP and a UDP (User Datagram Protocol). In some scenarios, the transport layer 400 may be based on the TCP protocol for accurate data transmission.

Figure 2:
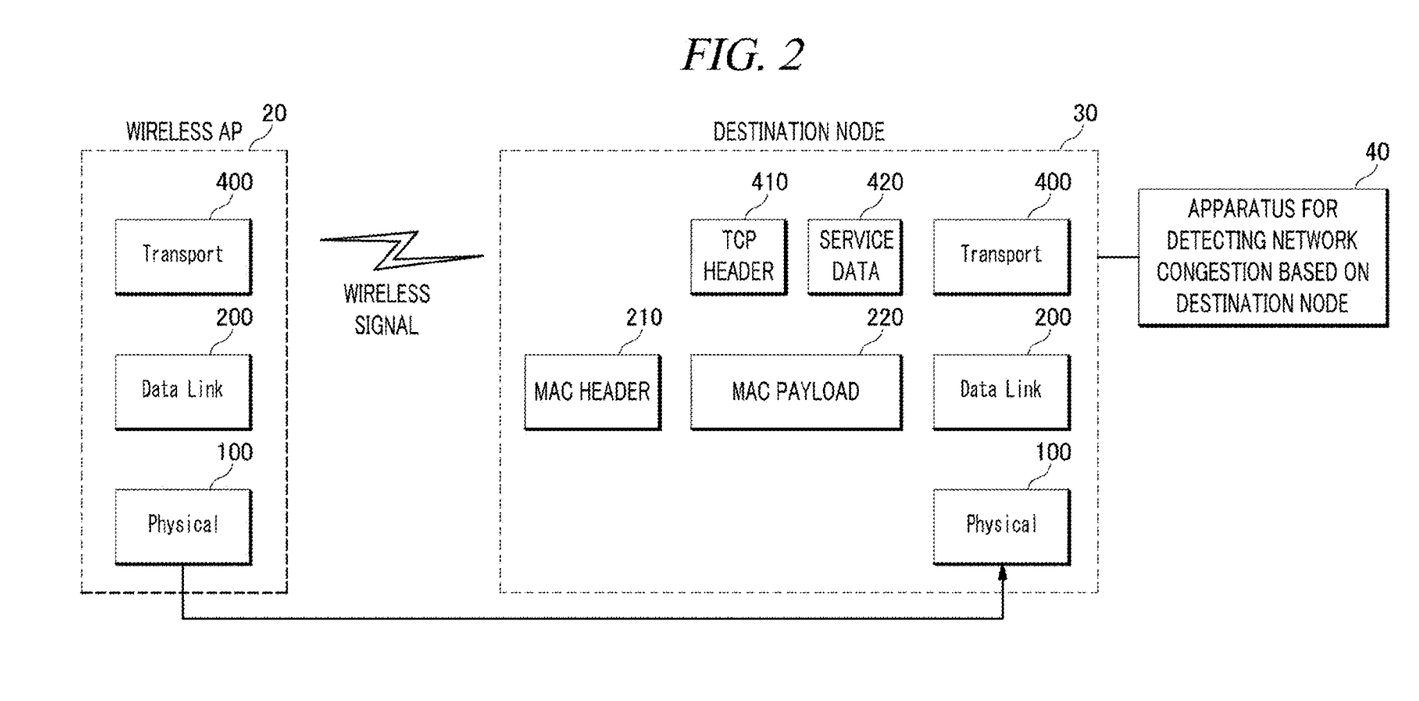
FIG. 2 simply illustrates data transmitted between a source node and a destination node by a defined communication protocol according to an exemplary embodiment of the present disclosure.

FIG. 2 simply illustrates data transmitted between a source node and a destination node by a defined communication protocol.

Referring to FIG. 2, each of a wireless AP (Access Point) 20 and a destination node 30 includes the physical layer 100, the data link layer 200, and the transport layer 400. Further, each of the wireless AP 20 and the destination node 30 may further include the network layer 300 and the application layer 500.

Figure 3:
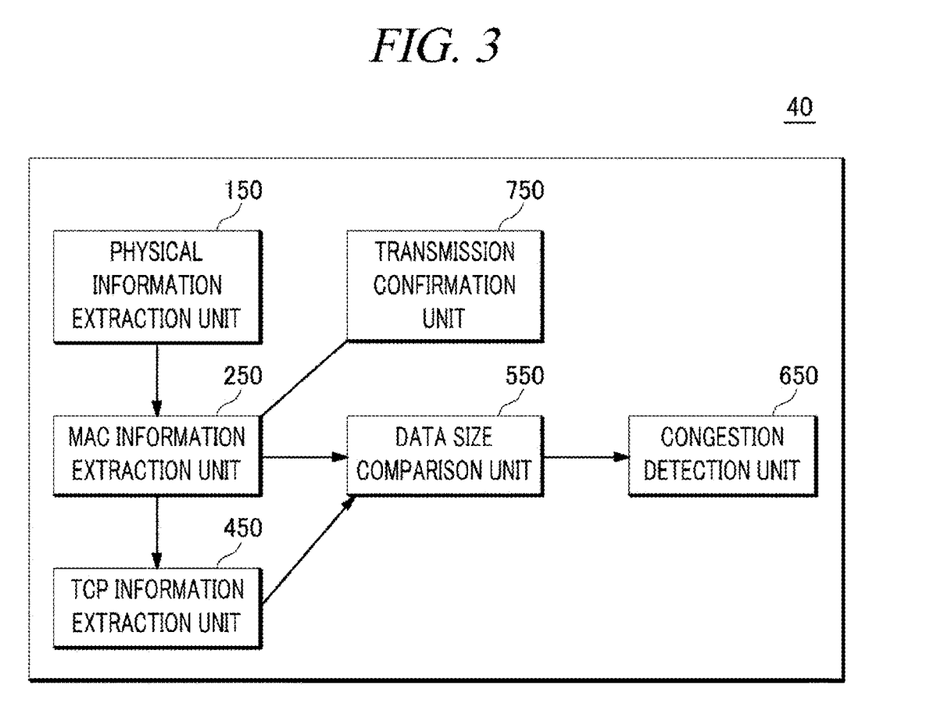
FIG. 3 is a block configuration diagram of an apparatus for detecting network congestion based on a destination node.

FIG. 3 is a block diagram of an apparatus for detecting network congestion based on a destination node.

A physical information extraction unit 150 extracts all the information received through an antenna of the destination node 30. A MAC information extraction unit 250 extracts a size of a MAC frame payload 220 from a MAC frame on the basis of the extracted physical information. A TCP information extraction unit 450 extracts a size of service data 420 from the MAC frame payload 220. A data size comparison unit 550 compares the size of the MAC frame payload 220 with the size of the service data 420. Further, a congestion detection unit 650 compares comparison result data received from the data size comparison unit 550 with a predetermined threshold value and determines presence or absence of network congestion.

Hereinafter, each component will be described in detail.

The physical information extraction unit 150 extracts physical information of all the electrical signals received through the antenna of the destination node 30. The physical information means data having a format for a specific purpose. Further, the physical information means all the electrical signals, such as loss caused by noise, received through the antenna in addition to data to be actually obtained. In some scenarios, the physical information may include physical information according to the IEEE 802.11 standard.

The MAC information extraction unit 250 extracts a size of a payload from a MAC frame which is physical information converted in the data link layer 200.

Herein, the MAC information extraction unit 250 checks whether the received electrical signal is data to be transmitted to the destination node by using address information such as "toDS, fromDS, destination address, and source address" recorded in a MAC frame header. Further, if it is confirmed that the received electrical signal is data to be transmitted to the destination node, the MAC information extraction unit 250 may extract a size of the MAC frame payload 220. To be more specific, the MAC information extraction unit 250 may select information to be transmitted to the destination node 30 among link information received from the antenna, on the basis of the address information recorded in the MAC frame header MAC. Herein, the MAC information extraction unit 250 may check whether data of air media terminate at the destination node.

The size of the payload 220 can be extracted without damaging the existing MAC frame since the MAC frame is just available to read. Therefore, the MAC frame is transferred to the upper layer as it is.

The TCP information extraction unit 450 extracts a size of the service data 420 from the MAC frame payload 220.

The data size comparison unit 550 compares the size of the MAC frame payload 220 with the size of the service data 420. Herein, the data size comparison unit 550 may operate in at least any one of the transport layer 400 and the application layer 500.

Hereinafter, an operation principle of the data size comparison unit 550 will be described in detail.

Figure 4:
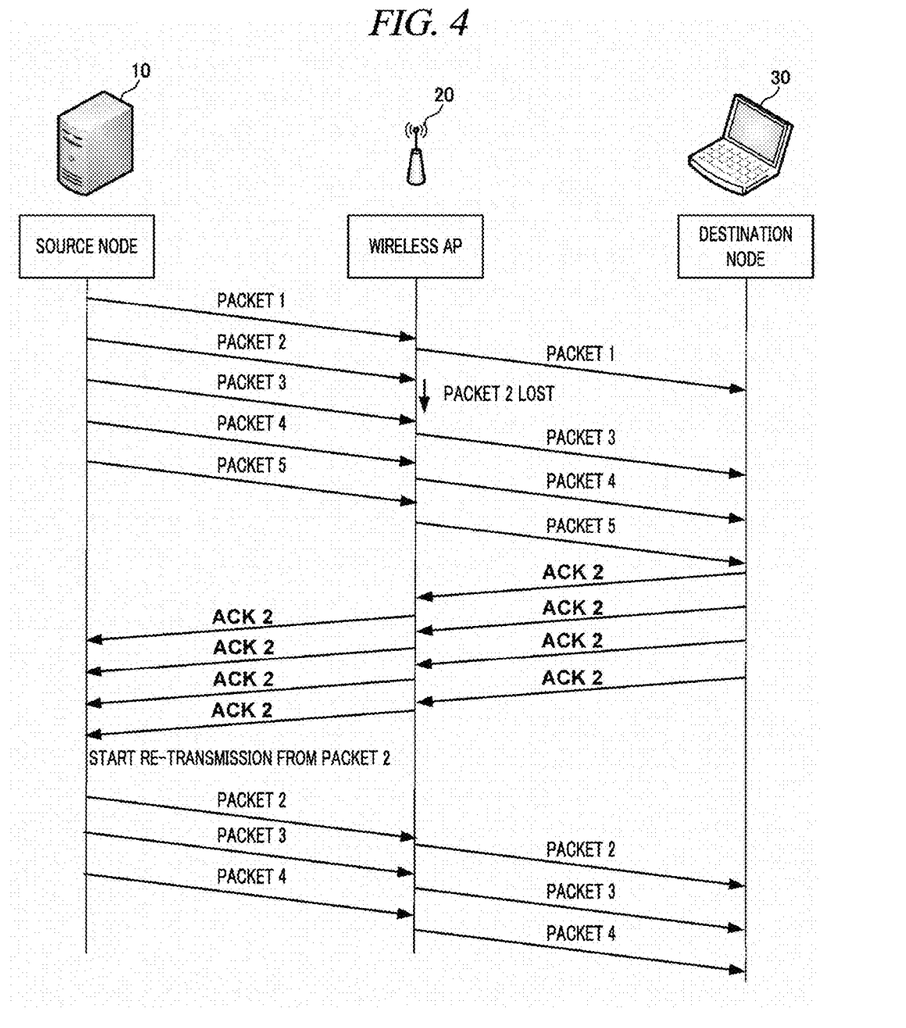
FIG. 4 is a diagram provided to describe a congestion control method at a transport layer according to a TCP protocol.

FIG. 4 is a diagram provided to describe a congestion control method at a transport layer according to a TCP protocol.

When determining presence or absence of network congestion, a source node 10 may use "duplicated ACK". To be specific, if any one of successive data packets does not reach the destination node 30, the destination node 30 continuously transmits, to the source node 10, ACK informing the source node 10 of a failure to receive a specific packet. If the source node 10 receives the ACK three or more times, the source node 10 transmits, to the destination node 30, packets including the specific packet and the packets subsequent thereto. Accordingly, the source node 10 transmits again all the packets subsequent to "packet 2" lost on the way as shown in FIG. 4. Therefore, the destination node 30 repeatedly receives "packet 3", "packet 4", and the like which are not lost.

That is, in the transport layer 400 and its upper layer of the destination node 30 according to the TCP protocol, re-transmitted data are not present. However, in its lower layers including the data link layer 200 and the physical layer 100, re-transmitted data may be present. Therefore, it is deemed that as a size of the MAC frame payload 220 of the data link layer 200 is greater than a size of the service data 420, the network becomes more congested.

A ratio between a size of the MAC frame payload 220 and a size of the service data 420 can be represented by a predetermined constant value. The data size comparison unit 550 may calculate a ratio between the two sizes by using the following Equation 1.

$$R_{MAC/TCP} = \frac{CS_{MAC}}{CS_{TCP/APP}} \quad \text{Equation 1}$$

Herein, $R_{MAC/TCP}$ represents a calculated congestion ratio, and CS represents a cumulative size of data accumulated from the beginning to the present point. TCP/APP represents the service data 420 obtained from the transport layer or the application layer, and MAC represents the payload 220 obtained from the MAC frame of the data link layer. Therefore, $CS_{MAC}$ is a cumulative size of data with respect to the payload obtained from the MAC frame of the data link layer, and $CS_{TCP/APP}$ is a cumulative size of data with respect to the service data obtained from the transport layer or the application layer. For example, if the calculated congestion ratio is 1, the corresponding wireless AP 20 may be determined as not having congestion. This is established on the assumption as shown in the following Equation 2.

$$S_{MAC} = S_{APP}$$

$$uS_{APP} \# S_{IPh} + S_{TCPh} + S_{APP} \quad \text{Equation 2}$$

Herein, S represents a size, $S_{MAC}$ represents a size of a payload obtained from a frame of a data link layer, $S_{APP}$ represents a size of service data of an application layer, $S_{IPh}$ represents a size of an IP header of a network layer frame, and $S_{TCPh}$ represents a size of a TCP header of a transport layer frame. In Equation 2, the size of the IP header and the size of the TCP header are much smaller than the size of the service data and thus can be assumed as "0".

Further, it is possible to determine presence or absence of network congestion without the above-described assumption. That is, considering the size of the TCP header and the size of the IP header in Equation 2, the size of the MAC payload is greater than the size of the service data. In this case, assuming the network is not congested, the calculated congestion ratio $R_{MAC/TCP}$ has a predetermined value higher than "1".

On the premise of the above-described assumption, the data size comparison unit 550 transfers the calculated congestion ratio (hereinafter, referred to as "ratio constant") to the congestion detection unit 650.

The congestion detection unit 650 receives the ratio constant as the comparison result data received from the data size comparison unit 550 and determines presence or absence of congestion. The congestion detection unit 650 may determine presence or absence of congestion by comparing the ratio constant with a predetermined threshold value. If a numerator is $CS_{MAC}$ and a denominator is $CS_{TCP/APP}$ as shown in Equation 1, when the ratio constant is greater than the threshold value, it may be determined that the network is congested. On the contrary, if a numerator is $CS_{TCP/APP}$ and a denominator is $CS_{MAC}$, when the ratio constant is smaller than the threshold value, it may be determined that the network is congested. For reference, the threshold value may be differently set by a user depending on a requirement for a service with respect to network congestion. Further, the data size comparison unit 550 compares the two sizes by a method as shown in Equation 1, and may also compare the two sizes by other conventional methods.

Herein, the threshold value may be differently set depending on a network service in use. For example, if a network service with a relatively low service quality requirement is used, the threshold value may be set high. As such, a standard for determining congestion of the wireless AP 20 may be differently set for each object. The congestion detection unit 650 may operate in at least any one of the transport layer 400 and the application layer 500.

Figure 5:
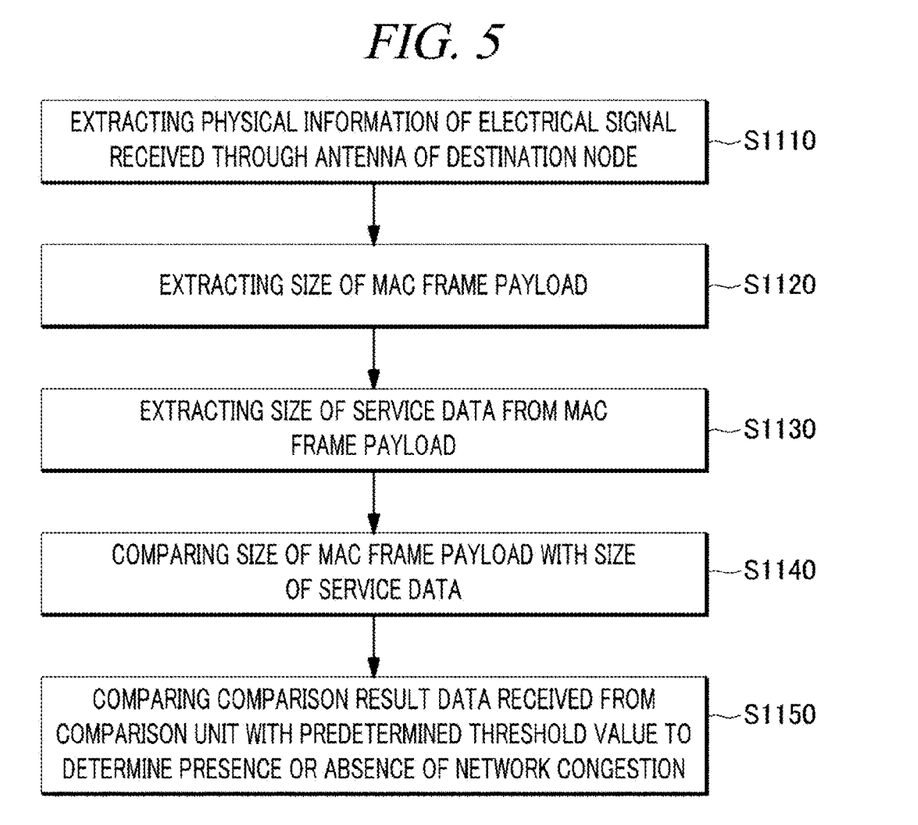
FIG. 5 is a flowchart of a method for detecting network congestion based on a destination node.

Hereinafter, a method for detecting network congestion based on a destination node will be described with reference to FIG. 5. FIG. 5 is a flowchart of a method for detecting network congestion based on a destination node.

Firstly, physical information is extracted from an electrical signal received through the antenna of the destination node 30 (S1110). Then, a size of the MAC frame payload 220 is extracted from a MAC frame on the basis of the extracted physical information (S1120). Then, the service data 420 are extracted from the MAC frame payload 220 (S1130), and a size of the MAC frame payload 220 and a size of the service data 420 are compared (S1140). Then, comparison result data obtained by comparing the size of the MAC frame payload 220 and the size of the service data 420 are compared with a predetermined threshold value to determine presence or absence of network congestion (S1150).

Hereinafter, each block will be described in detail.

In S1110, the physical information means data having a format for a specific purpose. The physical information means all the electrical signals (for example, loss caused by noise) received through the antenna in addition to data to be actually obtained. The above-described the physical information may include physical information according to the IEEE 802.11 standard.

In S1120, the size of the payload is extracted from the MAC frame which is physical information converted in the data link layer 200. Herein, the size of the MAC frame payload may be substantially identical to a size of all the information except header information. However, a method for extracting a size of the payload is not limited to the above-described method.

Then, in S1130, the size of the service data included in the MAC frame payload is extracted. The size of the service data may be obtained by using data offset information and a sequence number recorded in the TCP header. Herein, the data offset information recorded in the TCP header refers to information indicating where service data among data received from a lower layer begins. The beginning of the service data means the end of the header. Accordingly, a size of the TCP header can be obtained. The sequence number includes information indicating the order of the byte of transmitted data corresponding to the foremost data in a packet. A sequence number is increased as much as a size of data. By using the sequence number, a size of the received service data can be extracted. However, a method for extracting a size of the service data is not limited to the above-described method. A size of the service data can be extracted by other measurement methods.

Further, in S1130, the service data are present the frames of the transport layer and the application layer. According to the assumption as shown in Equation 2, the TCP header and the IP header may have a size close to "0". Therefore, service data from any of the layers can be used. However, without the assumption as shown in Equation 2, a size of the TCP header and a size of the IP header may be considered. Thus, service data from a specific layer may be used.

In S1140, the size of the MAC fame payload 220 and the size of the service data 420 are compared. Such a comparison operation may be carried out in at least any one of the transport layer 400 and the application layer 500.

A detailed operation principle of S1140 is the same as described above.

In S1150, a ratio constant $R_{MAC/TCP}$ as the comparison result data obtained by comparing the size of the MAC frame payload 220 and the size of the service data 420 MAC is received, and presence or absence of network congestion is determined on the basis of the received ratio constant. A detailed operation principle of block S1150 is the same as described above.

Meanwhile, according to the method for detecting network congestion based on a destination node, the destination node 30 may detect congestion of the wireless AP 20 connected thereto and switch its connection object to another wireless AP. Further, the destination node 30 may sequentially stop low-priority services among its various network services. As such, it is possible to accurately detect network congestion on the basis of the destination node and also possible to actively control a network service depending on the situation.

A wired or wireless connection may be formed between the source node 10 and the wireless AP 20 and between the wireless AP 20 and the destination node 30. Further, between the source node 10 and the destination node 30, there may be one or more intermediate nodes or the wireless AP 20 directly communicating with the destination node 30.

Herein, the network may be implemented as a wired network such as a Local Area Network (LAN), a Wide Area Network (WAN), or a Value Added Network (VAN), or all kinds of wireless networks such as a mobile radio communication network or a satellite communication network.

If the apparatus or method for detecting network congestion is used, it is possible to determine network congestion on the basis of a destination and thus possible to control the congestion.

Figure 6:
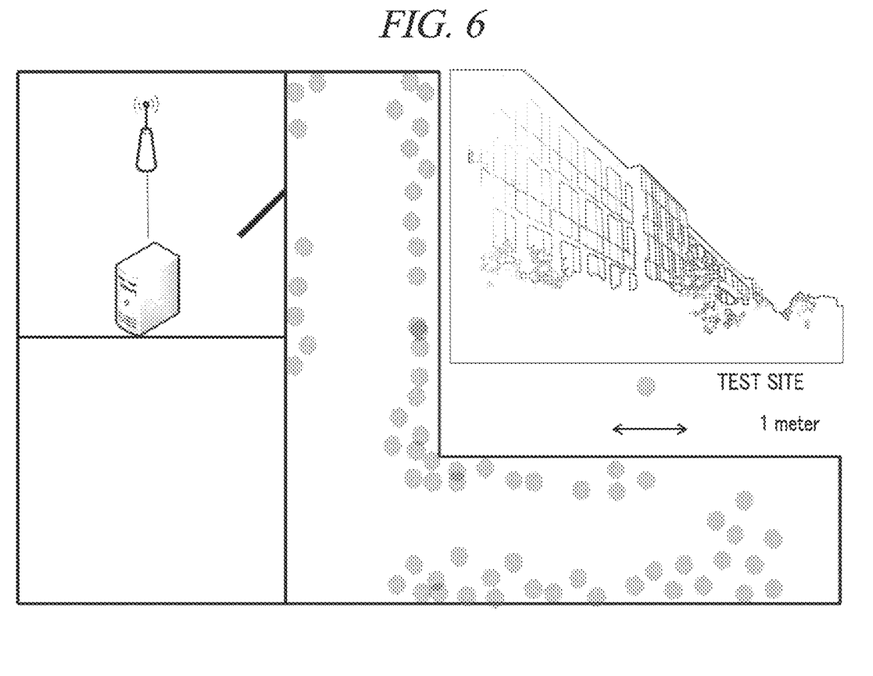
FIG. 6 visualizes an experiment environment for checking a relationship between a calculated congestion ratio and an actual quality of a specific service.

FIG. 6 visualizes an experiment environment for checking a relationship between a calculated congestion ratio and an actual quality of a specific service. A wireless AP shown in the upper left of FIG. 6 is an intermediate node connecting a wired source node that provides a network service and a wireless destination node. Herein, it is assumed that the wired source node has wired connection to (a hop or multi-hop) the wireless AP and the wired source node and the wireless AP are very close to each other. Further, in FIG. 6, a position of the wireless destination node is indicated by a "circle". In FIG. 6, data transmitted from the wired source node to the wireless destination node is video streaming. For example, the video streaming will be described as being communicated by using a JAVA-based socket programing according to TCP standards. A quality of the video streaming service was determined on the basis of a delay time, and an experiment on a relationship between a delay time required to receive a frame of a video image and network congestion occurring due to a packet loss at a wireless AP was conducted.

Figure 7:
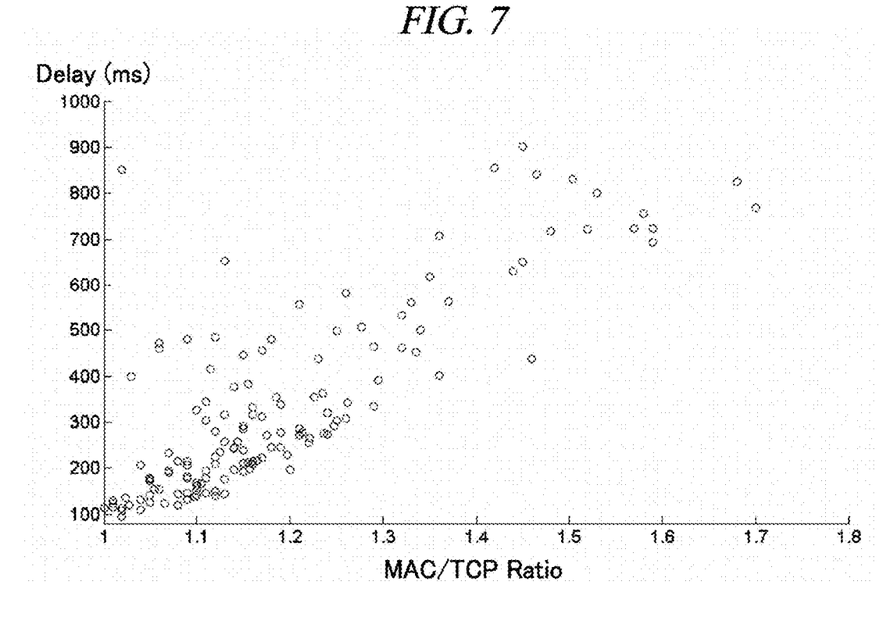
FIG. 7 illustrates a result of an experiment on a relationship between a delay time required to receive a frame of a video image if a source node is a wired device and network congestion occurring due to a packet loss at a wireless AP.

FIG. 7 illustrates a result of an experiment on a relationship between a delay time required to receive a frame of a video image if a source node is a wired device and network congestion occurring due to a packet loss at a wireless AP.

Figure 8:
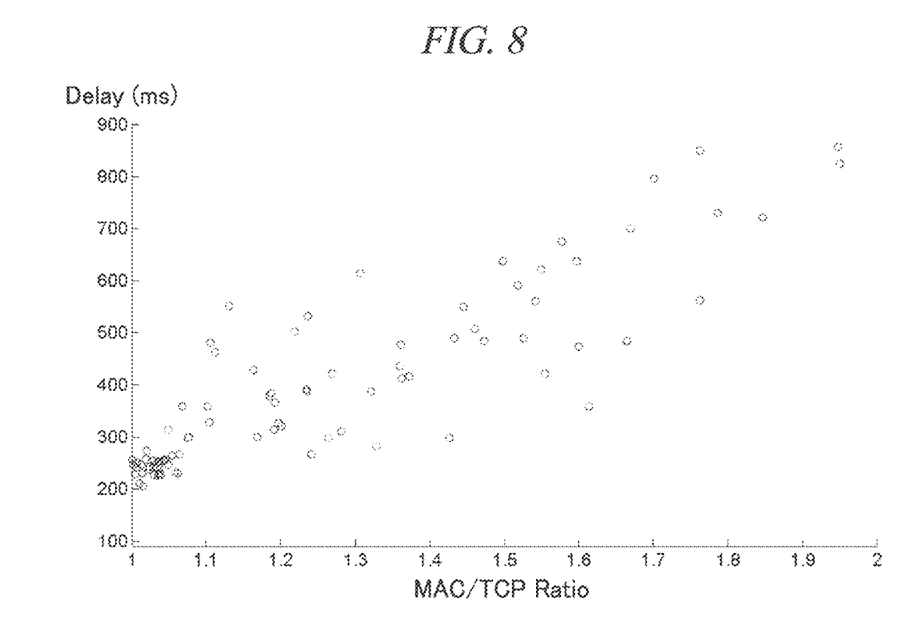
FIG. 8 illustrates a result of an experiment on a relationship between a delay time required to receive a frame of a video image if a source node is a wireless device and network congestion occurring due to a packet loss at a wireless AP.

Further, FIG. 8 illustrates a result of an experiment on a relationship between a delay time required to receive a frame of a video image if a source node is a wireless device and network congestion occurring due to a packet loss at a wireless AP.

In theory, the service delay time shows a proportional relationship with the calculated congestion ratio. For reference, the service delay time may be involved in not only presence or absence of network congestion but also a status of a link and a buffer state of a data receiver. If the experiment is conducted in an environment in which the correlation of a status of the link and a buffer state of the data receiver with the service delay time is minimized, the experiment results as shown in FIG. 7 and FIG. 8 can be obtained.

Referring to FIG. 8, the source node wirelessly transmits data to the wireless AP. Thus, it can be seen that the service delay time is increased overall, as compared with the result as shown in FIG. 7. Further, referring to FIG. 7 and FIG. 8, it can be seen that the service delay time has a proportional relationship with the calculated congestion ratio.

Each component of the apparatus for detecting network congestion based on a destination node may imply software or hardware such as a field programmable gate array (FPGA) or an application specific integrated circuit (ASIC), and carry out a predetermined function.

However, the "components" are not limited to the software or the hardware, and each of the components may be stored in an addressable storage medium or may be configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables, and the like. The components and functions thereof can be combined with each other or can be divided.

Meanwhile, each component of the apparatus for detecting network congestion based on a destination node may be configured as a kind of a "module". The "module" may imply software or hardware such as a field programmable gate array (FPGA) or an application specific integrated circuit (ASIC), and carry out a predetermined function. However, the module is not limited to the software or the hardware. The module may be stored in an addressable storage medium or may be configured to implement one or more processors. The components and functions provided by the modules can be combined with each other or can be divided.

The method for detecting network congestion based on a destination node can be embodied in a storage medium including instruction codes executable by a computer or processor such as a program module executed by the computer or processor. A data structure can be stored in the storage medium executable by the computer or processor. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as a computer-readable instruction code, a data structure, a program module, or other data. The communication medium typically includes the computer-readable instruction code, the data structure, the program module, or other data of a modulated data signal such as a carrier wave, or other transmission mechanism, and includes information transmission mediums.

Further, the method for detecting network congestion based on a destination node can be implemented by a computer-readable code in a computer-readable storage medium. The computer-readable storage medium includes all kinds of storage media in which computer-readable data are stored and may include, for example, a ROM (Read Only Memory), a RAM (Random Access Memory), a magnetic tape, a magnetic disc, a flash memory, an optical data storage device, etc. Further, the computer-readable storage medium can be distributed in a computer system connected via a computer communication network and can be stored and executed as a code that is readable in a distributed manner.

The method and the apparatus of the present disclosure have been explained in relationship to a specific exemplary scenario, but its components or at least a part of its operation can be implemented by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An apparatus for detecting network congestion based on a destination node, comprising one or more processors,
   at least one processor of the one or more processors is configured to:
   extract physical information of an electrical signal received through an antenna of the destination node;
   extract a MAC information including a size of a MAC frame payload from a MAC frame on the basis of the extracted physical information;
   extract a TCP information including a size of service data included in the MAC frame payload;
   generate comparison result data by comparing the size of the MAC frame payload with the size of the service data; and
   determine presence or absence of network congestion by comparing the comparison result data with a predetermined threshold value.

2. The apparatus according to claim 1,
wherein the at least one processor extracts the size of the MAC frame payload when it is confirmed that the received electrical signal is data to be transmitted to the destination node by using address information recorded in a MAC frame header.

3. The apparatus according to claim 1,
wherein the at least one processor calculates a ratio between the size of the MAC frame payload and the size of the service data, and the comparison result data include the calculated ratio.

4. The apparatus according to claim 3,
wherein the at least one processor calculates the ratio according to the following Equation:

$$R_{MAC/TCP} = \frac{CS_{MAC}}{CS_{TCP/APP}},$$

and
wherein $R_{MAC/TCP}$ represents a calculated congestion ratio, $CS_{MAC}$ represents a cumulative size of data with respect to a payload obtained from a MAC frame of a data link layer, and $CS_{TCP/APP}$ represents a cumulative size of data with respect to service data obtained from a transport layer or an application layer.

5. The apparatus according to claim 1,
wherein the at least one processor operates in at least any one of a transport layer and an application layer of the destination node when it compares the size of the MAC frame payload with the size of the service data or compares the comparison result data with the predetermined threshold value.

6. A method for detecting network congestion based on a destination node by using an apparatus for detecting network congestion based on a destination node, comprising:
extracting physical information of an electrical signal received through an antenna of the destination node;
extracting a size of a MAC frame payload from a MAC frame on the basis of the extracted physical information;
extracting a size of service data included in the MAC frame payload;
comparing the size of the MAC frame payload with the size of the service data and generating comparison result data; and
comparing the generated comparison result data with a predetermined threshold value to determine presence or absence of network congestion.

7. The method according to claim 6, wherein the step of extracting a size of service data includes extracting a size of service data of a data frame present in a transport layer or an application layer.

8. The method according to claim 6, wherein the step of extracting a size of service data includes extracting a size of service data by using data offset information and a sequence number recorded in a TCP header.

9. The method according to claim 6, wherein the step of extracting a size of a MAC frame payload includes extracting a size of a payload of the MAC frame by reading the MAC frame without damaging the MAC frame and transferring the MAC frame to its upper layer as it is.

10. The method according to claim 6, wherein the step of generating comparison result data includes generating comparison result data by calculating a ratio between the size of the MAC frame payload and the size of the service data.

11. The method according to claim 10,
wherein the step of generating comparison result data includes calculating the ratio according to the following Equation:

$$R_{MAC/TCP} = \frac{CS_{MAC}}{CS_{TCP/APP}},$$

and
wherein $R_{MAC/TCP}$ represents a calculated congestion ratio, $CS_{MAC}$ represents a cumulative size of data with respect to a payload obtained from a MAC frame of a data link layer, and $CS_{TCP/APP}$ represents a cumulative size of data with respect to service data obtained from a transport layer or an application layer.

* * * * *